(12) United States Patent
Ota et al.

(10) Patent No.: US 6,618,669 B2
(45) Date of Patent: Sep. 9, 2003

(54) NAVIGATION APPARATUS, NAVIGATION METHOD AND NAVIGATION PROGRAM

(75) Inventors: Masako Ota, Tokyo (JP); Tatsuya Mitsugi, Tokyo (JP); Kazuhiro Yokouchi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/961,448

(22) Filed: Sep. 25, 2001

(65) Prior Publication Data

US 2002/0152021 A1 Oct. 17, 2002

(30) Foreign Application Priority Data

Apr. 12, 2001 (JP) ........................................ 2001-114394

(51) Int. Cl.[7] .............................................. G08G 1/123
(52) U.S. Cl. ...................... 701/208; 701/210; 701/224; 340/995; 340/988
(58) Field of Search ................................ 701/200, 201, 701/207, 208, 209, 210, 211, 213, 224; 340/995, 988, 990

(56) References Cited

U.S. PATENT DOCUMENTS 5,821,880 A * 10/1998 Morimoto et al. .......... 340/988

FOREIGN PATENT DOCUMENTS

| JP | A11304505 | 11/1999 |
|----|-----------|---------|
| JP | A11337361 | 12/1999 |

* cited by examiner

Primary Examiner—Thomas G. Black
Assistant Examiner—Arthur D. Donnelly
(74) Attorney, Agent, or Firm—Birch, Stewart, Kolasch & Birch, LLP (57) ABSTRACT

In a navigation apparatus, operating function control means of system control means infers a operation, which a user is expected to set next time on a screen of display means by operating means, from a set situation of each item selected on a map screen based on map data read from map data storage means, and when a destination has not been set, for example, presents a setting switch for the destination as a function switch, or when an en route location has not been set by route setting means, presents a setting switch for the en route location as a function switch. The operating function control means also presents a switch for retrieving surrounding establishments, which the user is expected to be desirous of looking for, based on the time of day or the duration of driving. The navigation apparatus enables the user to perform desired setting operations and retrieval of establishments without the need for complicated operations.

15 Claims, 13 Drawing Sheets

NAVIGATION APPARATUS, NAVIGATION METHOD AND NAVIGATION PROGRAM

BACKGROUND OF THE INVENTION

1. Field of the Invention

This invention relates to a navigation apparatus, a navigation method, and a navigation program for guiding a driver to a destination while supplying the driver with various pieces of information.

2. Description of the Related Art

FIGS. 21 to 24 are display screens in a conventional navigation apparatus, in which the reference numerals 1 to 4 denote switches displayed on the screen.

Next, an operation of this navigation device will be described below.

Figure 21:
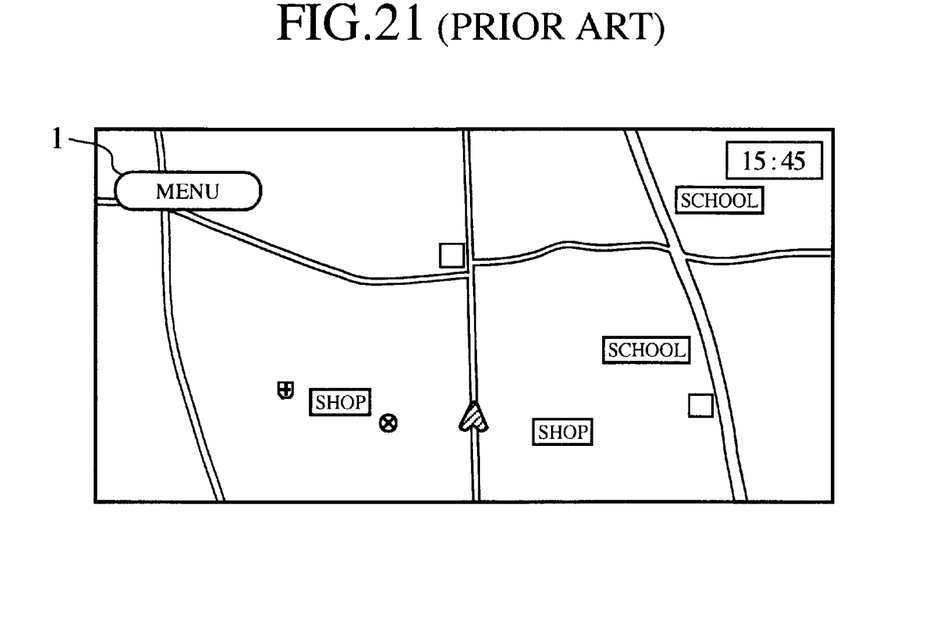
FIG. 21 is a view showing a display example in a conventional navigation apparatus.
Figure 22:
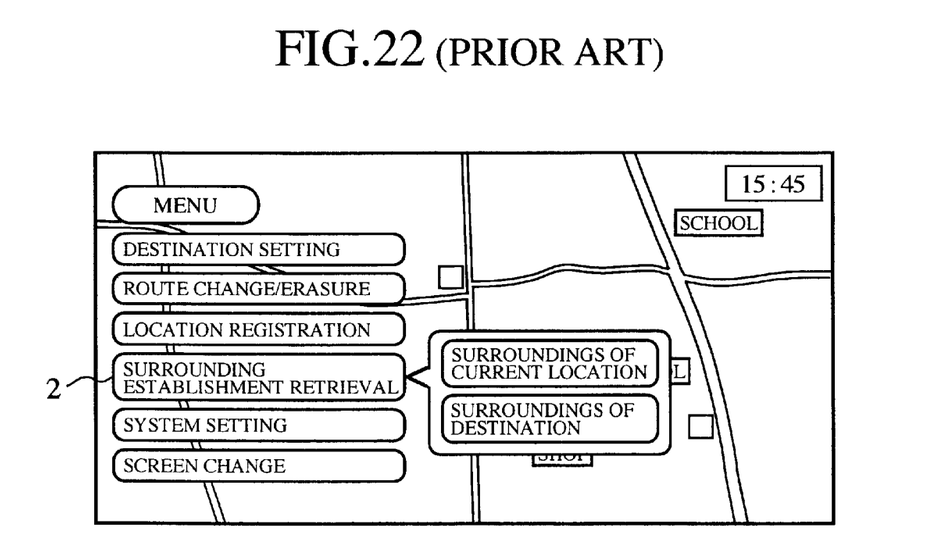
FIG. 22 is a view showing a display example in the conventional navigation apparatus.
Figure 23:
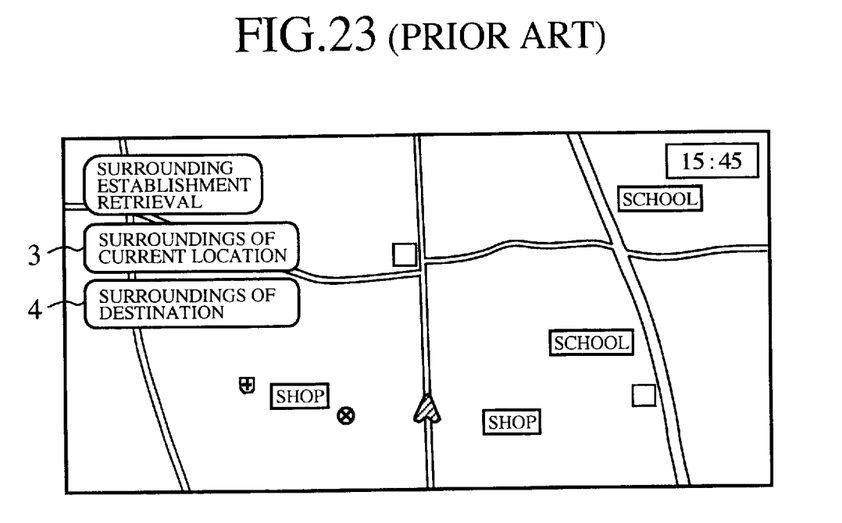
FIG. 23 is a view showing a display example in the conventional navigation apparatus.
Figure 24:
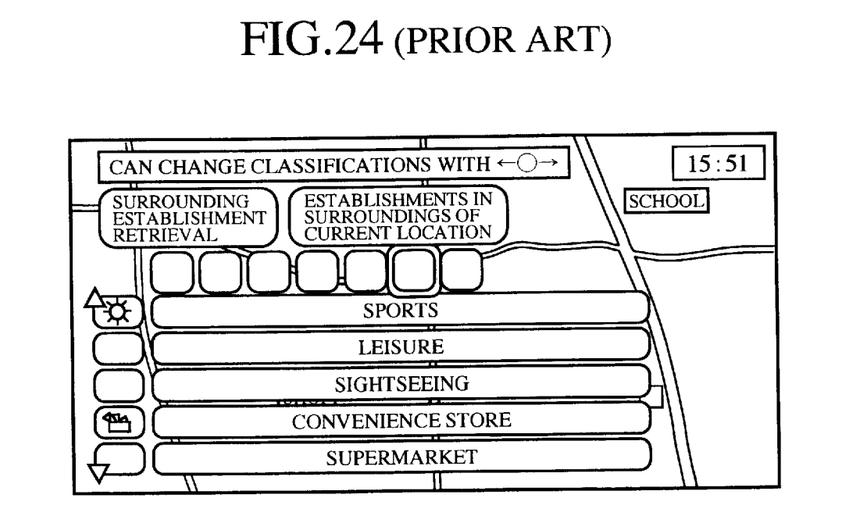
FIG. 24 is a view showing a display example in the conventional navigation apparatus.

To perform various settings such as setting of a destination and retrieval of an establishment, a menu switch 1 on the menu display screen in FIG. 21 is turned on. As a result, various menu switches are displayed as shown on the screen in FIG. 22. Then, a surrounding establishment retrieval switch 2 is tripped on this screen. As a result, a surroundings of current location switch 3 and a surroundings of destination switch 4 are displayed as shown on the screen of FIG. 23. Then, on this screen, the surroundings of current location switch 3 is turned on. As a result, switches for selecting various establishments in the surroundings of the current location are displayed as shown in FIG. 24. With the navigation method in the conventional navigation apparatus, as described above, switches are sequentially selected in a hierarchical manner from the menu display screen to display a switch permitting a desired setting, and the setting is made using the switch.

On the other hand, for the conventional navigation apparatuses, navigation methods for voice entry of retrieval keywords by interactive voice control have also been proposed.

The conventional navigation apparatus and navigation method are constituted as described above. Thus, a user had to narrow down retrieval conditions with the use of a plurality of switches until reaching a desired setting switch, and repeat a similar procedure each time the level in the hierarchy changes. Consequently, the complicated handling of the screens is required.

When interactive voice control is used, on the other hand, the user need not follow the hierarchy. Depending on the environment in the vehicle such as amid noises, however, the voice-entered retrieval keyword may be unrecognized or recognized erroneously, often necessitating repeated pronunciation of the retrieval keyword. Even in a navigation apparatus with a voice entry function, therefore, a method involving switch operations is generally used in combination, and complicated screen handling is required.

SUMMARY OF THE INVENTION

The present invention has been accomplished to solve the above problems. It is an object of the present invention to provide a navigation apparatus, a navigation method, and a navigation program capable of various settings, which a user would desire, without the need for complicated handling of screens.

According to a first aspect of the present invention, there is provided a navigation apparatus comprising: map data storage means for storing map data; current position detecting means for detecting a current position of a vehicle and producing current position data; operating means for performing various entries according to an operation; display control means for displaying on predetermined display means a map screen based on the map data stored in the map data storage means, the current position of the vehicle on the map screen based on the current position data, and a setting screen for selection of a function by the operating means; and operating function control means for predicting a next operation according to the operation of the operating means and a current situation, and changing the function on the setting screen according to the results of prediction.

Thus, a next operation is determined according to the operation of the operating means and the current situation. Based on this determination, a setting function that the user will need is inferred, and presented as a function switch. Consequently, an advantageous effect is obtained that the desired setting and retrieval can be performed without the need for complicated switch operations.

In the navigation apparatus, the operating function control means may change the function according to the set situation of each item.

In the navigation apparatus, the operating function control means may change the function according to the state of the vehicle.

In the navigation apparatus, the operating function control means may change the function according to the time of day.

In the navigation apparatus, the operating function control means may change the function according to the duration of driving.

In the navigation apparatus, the operating function control means may change the function according to the information on the vehicle.

In the navigation apparatus, the operating means may comprise a function switch.

According to a second aspect of the present invention, there is provided a navigation method comprising the steps of: detecting a current position of a vehicle and producing current position data; performing various entries according to the operation of operating means; displaying on predetermined display means a map screen based on map data stored in map data storage means, the current position of the vehicle on the map screen based on the current position data, and a setting screen for selection of a function by the operation of the operating means; and predicting a next operation according to the operation of the operating means and the current situation, and changing the function on the setting screen according to the results of prediction.

Thus, an advantageous effect is obtained that a next operation can be determined according to the operation of the operating means and the current situation, and the desired setting and retrieval can be performed without the need for complicated switch operations.

In the navigation method, the step of changing the function may change the function according to the set situation of each item.

In the navigation method, the step of changing the function may change the function according to the state of the vehicle.

In the navigation method, the step of changing the function may change the function according to the time of day.

In the navigation method, the step of changing the function may change the function according to the duration of driving.

In the navigation method, the step of changing the function may change the function according to the information on the vehicle.

The navigation method may further comprise the steps of setting a manual change mode or a predicted change mode according to the operation; and effecting a sequential transition of the function on the setting screen having a hierarchical structure to the next lower level by the operation in the manual change mode, or effecting a transition of the function on the setting screen to a target level by the operation, while skipping intermediate levels, in the predicted change mode.

According to a third aspect of the present invention, there is provided a navigation program for allowing a computer in a navigation apparatus to function as map data storage means for storing map data; current position detecting means for detecting a current position of a vehicle and producing current position data; operation control means for performing various entries according to an operation of operating means; display control means for displaying on predetermined display means a map screen based on the map data stored in the map data storage means, the current position of the vehicle on the map screen based on the current position data, and a setting screen for selection of a function by the operating means; and operating function control means for predicting a next operation according to the operation of the operating means and the current situation, and changing the function on the setting screen according to the results of prediction.

Thus, an advantageous effect is obtained that a next operation can be determined according to the operation of the operating means and the current situation, and the desired setting and retrieval can be performed without the need for complicated switch operations.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of the present invention will now be described in detail with reference to the accompanying drawings.

Embodiment 1

Figure 1:
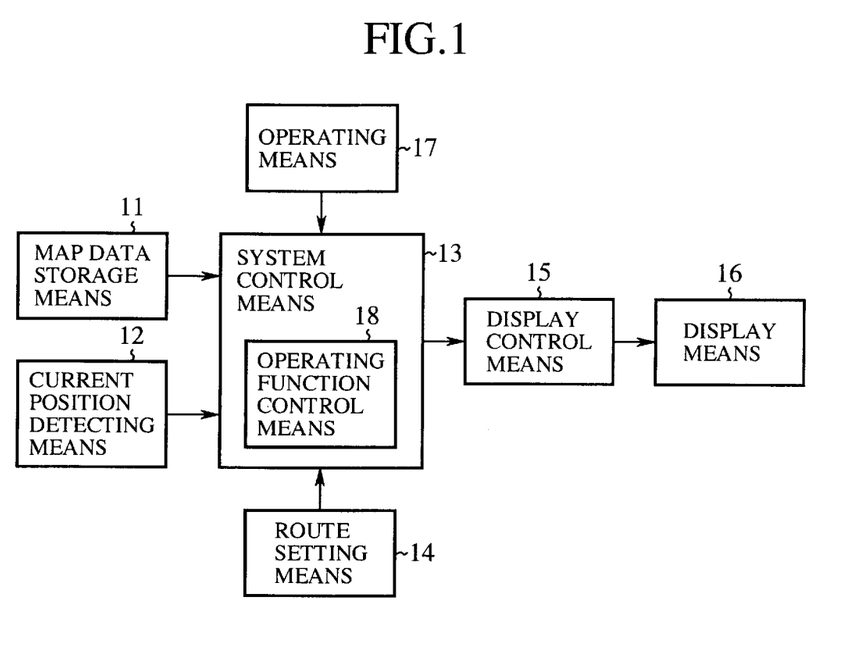
FIG. 1 is a block diagram showing a functional configuration of a navigation apparatus according to a first embodiment of the present invention.

FIG. 1 is a block diagram showing a functional configuration of a navigation apparatus according to a first embodiment of the present invention. In the figure, reference numeral 11 denotes map data storage means, 12 is current position detecting means, 13 is system control means, 14 is route setting means, 15 is display control means, 16 display means, 17 is operating means, and 18 is operating function control means in the system control means 13.

Next, the operation of the navigation apparatus will be described below.

The map data storage means 11 stores map data, such as road information on roads where a vehicle runs, and information on establishments (types, names, locations, telephone numbers, etc.). The current position detecting means 12 detects the current position of the vehicle based on output data from a GPS receiver and various sensors. The system control means 13 constitutes operation control means for reading necessary data from the map data storage means 11 and performing various entries according to the operation of the operating means 17, and takes in the current position of the vehicle from the current position detecting means 12 to control the operation of the entire system of the navigation apparatus. The system control means 13 is composed of, for example, a microcomputer, a read-only memory (hereinafter referred to as ROM), and a random access memory (hereinafter referred to as RAM).

The route setting means 14 searches a route to the entered destination of the vehicle, and stores the route. The display control means 15 generates display signals for display of a road map, a current position mark, a destination mark, etc. according to instructions from the system control means 13. The display means 16 displays the road map, the current position mark, the destination mark, etc. on a screen in response to the display signals from the display control means 15. The operating means 17, when operated by a user, can enter the destination at the time of route setting, or retrieve an establishment. The operating function control means 18 changes the functions and arrangement of the operating switches in accordance with the user's operating status.

Figure 2:
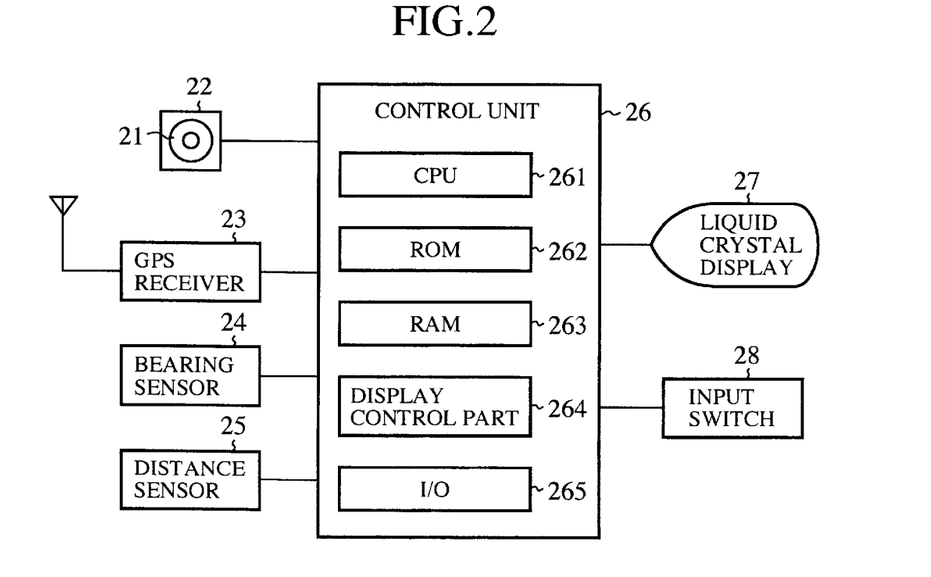
FIG. 2 is a block diagram showing an example of a hardware configuration of the navigation apparatus according to the first embodiment of the present invention.

FIG. 2 is a block diagram showing an example of a more concrete hardware configuration of the navigation apparatus of FIG. 1. In the figure, reference numeral 21 denotes a CD-ROM (compact disk ROM), 22 is a CD-ROM driver for driving the CD-ROM 21, 23 is a GPS receiver for receiving radio waves from GPS satellites and detecting the current position of the vehicle, 24 is a bearing sensor for detecting the bearing of the vehicle, 25 is a distance sensor for detecting a distance traveled by the vehicle, 26 is a control unit for performing various computations and controlling the entire apparatus, 27 is a liquid crystal display on which display data from the control unit 26 are displayed, 28 is an input switch for entry of the destination, etc. which comprises touch switches, remote control switches, function switches, etc. In the control unit 26, 261 denotes a central processing unit (CPU), 262 is a ROM, 263 is a RAM, 264 is a display control part for performing display control of the liquid crystal display 27, and 265 is an input/output unit (I/O) for performing inputting and outputting between the control unit 26 and the outside.

In the corresponding relationship between FIGS. 1 and 2, the CD-ROM 21 corresponds to the map data storage means 11. The GPS receiver 23, bearing sensor 24 and distance sensor 25 correspond to the current position detecting means 12. The input switch 28 corresponds to the operating mean 17. The control unit 26 corresponds to the system control means 13, route setting means 14, and display control means 15. The liquid crystal display 27 corresponds to the display means 16. In the control unit 26, the display control part 264 corresponds to the display control means 15, and the CPU 261 has a configuration including the operating function control means 18 and others.

The operation will be described below.

Figure 3:
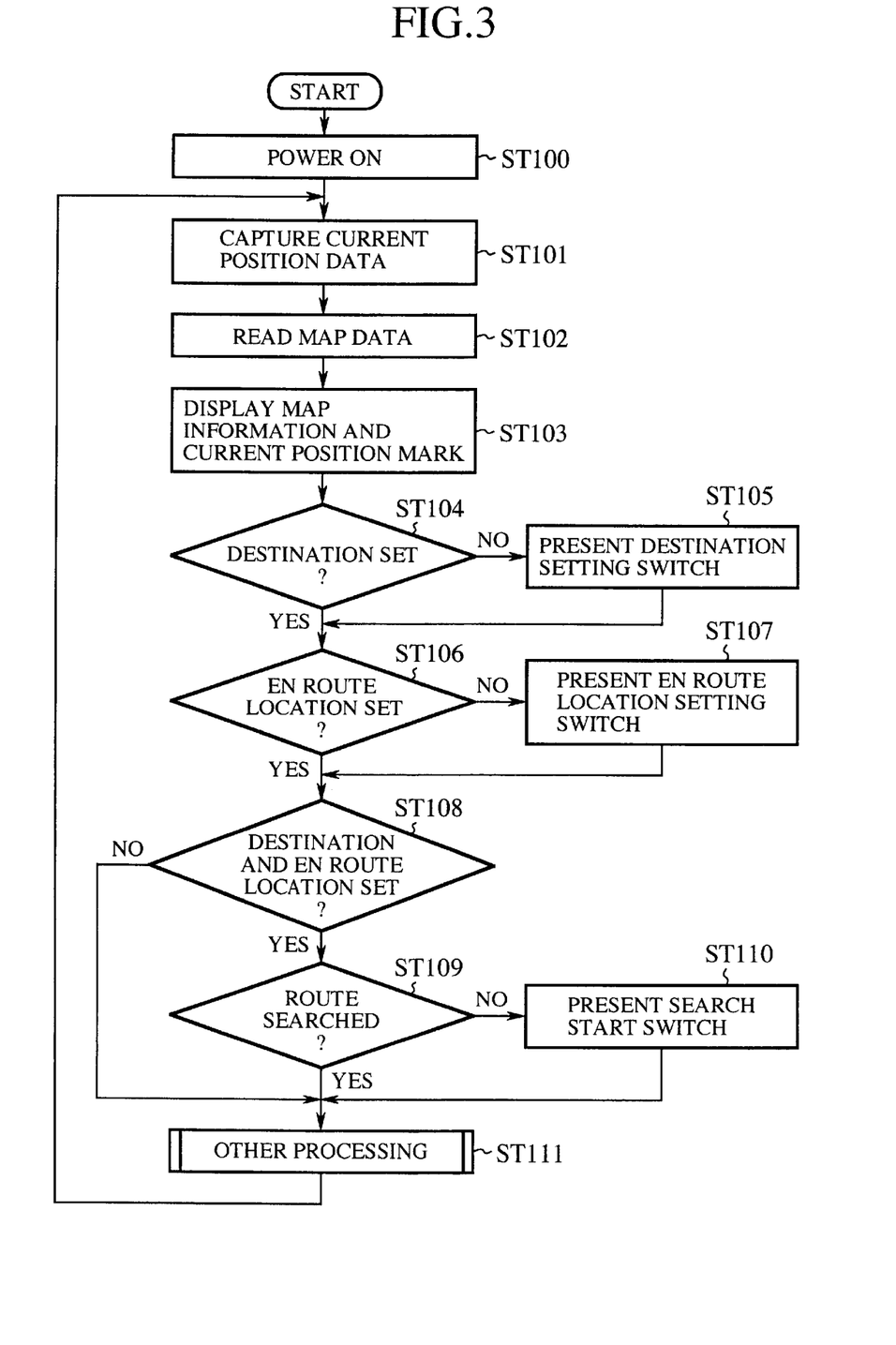
FIG. 3 is a flow chart for illustrating the actions of the navigation apparatus according to the first embodiment of the present invention.

FIG. 3 is a flow chart of a navigation method by the operating function control means 18 in the configuration of FIG. 1 (the CPU 261 in the example of FIG. 2). This flow chart shows a procedure for determining the arrangement and functions of the operating switches according to various set situations until driving is started after the user operates an ignition switch to turn on a power source of the navigation apparatus.

In Step ST100, the power to the navigation apparatus in the vehicle is turned on. In Step ST101, data on the current position of the vehicle is captured from the current position detecting means 12. In Step ST102, map data on the surroundings of the current position is read from the map data storage means 11 on the basis of the current position of the vehicle obtained in Step ST101. In Step ST103, map information is displayed on the display means 16, and a current position mark is displayed at the current position of the vehicle. Normally, the actions in Steps ST101 through ST103 are repeated at certain time intervals to read map information according to driving of the vehicle for updating.

In Step ST104, whether a destination has been set or not is determined. If no destination has been set, the program goes to Step ST105, presenting the destination setting switch as a function switch. Then, the program proceeds to Step ST106. If the destination has been set, the program proceeds to Step ST106, determining whether an en route location has been set or not. If an en route location has not been set, the program goes to Step ST107, presenting an en route location setting switch as a function switch. Then, the program goes not Step ST108.

If the en route location has been set, the program goes to Step ST108, determining whether the destination or en route location has been set or not. If the answer is Yes, the program goes to Step ST109, determining whether a route has been searched or not. If the route has not been searched, the program goes to Step ST110, presenting a search start switch as a function switch. If the route has been searched, or upon presentation of the search start switch, or if neither the destination nor the en route location has been set in Step ST108, the program proceeds to Step ST111 to carry out other processings, and then returns to Step ST101. These other processings include, for example, screen generation processing, scroll processing, destination arrival determination processing, current time-of-day processing, elapsed time processing, remaining fuel amount detection processing, and error processing. As long as the power is on, the loop of FIG. 3 is performed repeatedly.

Figure 4:
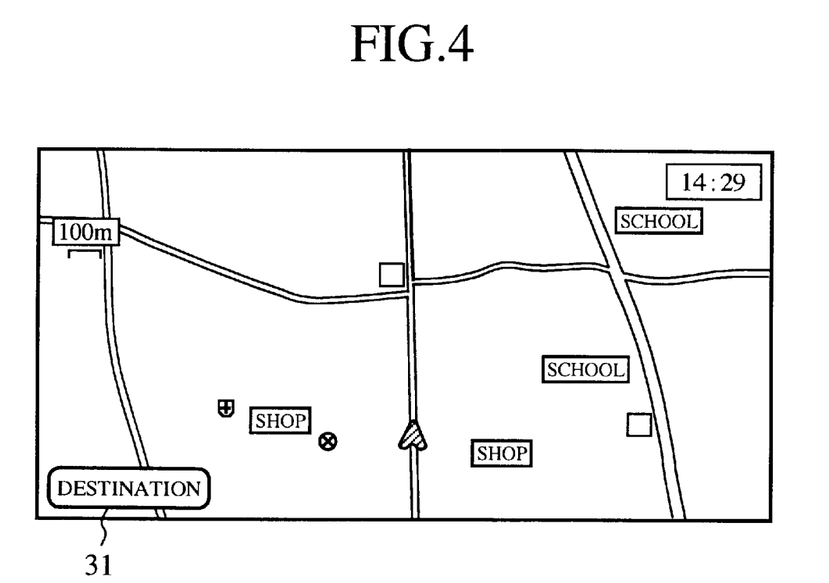
FIG. 4 is a view showing a display example in the navigation apparatus according to the first embodiment of the present invention.
Figure 5:
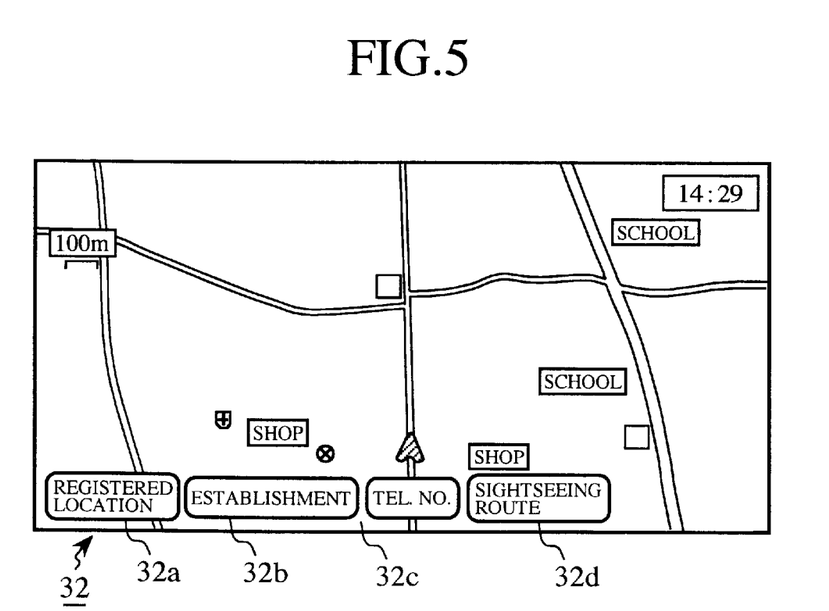
FIG. 5 is a view showing a display example in the navigation apparatus according to the first embodiment of the present invention.
Figure 6:
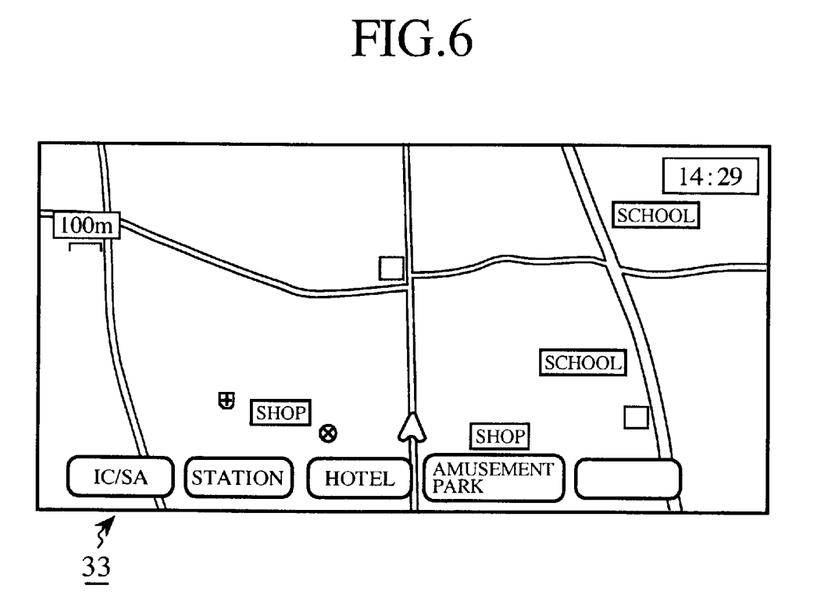
FIG. 6 is a view showing a display example in the navigation apparatus according to the first embodiment of the present invention.

FIGS. 4, 5 and 6 show the progress of display screens in the setting of a destination. When a destination switch 31 is activated on the screen of FIG. 4, the screen of FIG. 5 appears, and the user's choices of the destination are predicted to display a plurality of switches 32 (32a to 32d), representing options, on the screen automatically. Then, when the user turns on an establishment switch 32b among the switches, the screen is changed to the screen of FIG. 6, the user's choices of the establishment are predicted to display a plurality of switches 33, representing options, on the screen automatically.

Upon operation, in the foregoing manner, of the destination setting switch presented as the function switch, the function of the next lower level is assigned newly to the function switch, as shown in FIG. 5. Each time an operation is carried out, the function of the next lower level is assigned sequentially. In this manner, the user can set the destination by operating the function switch.

Figure 7:
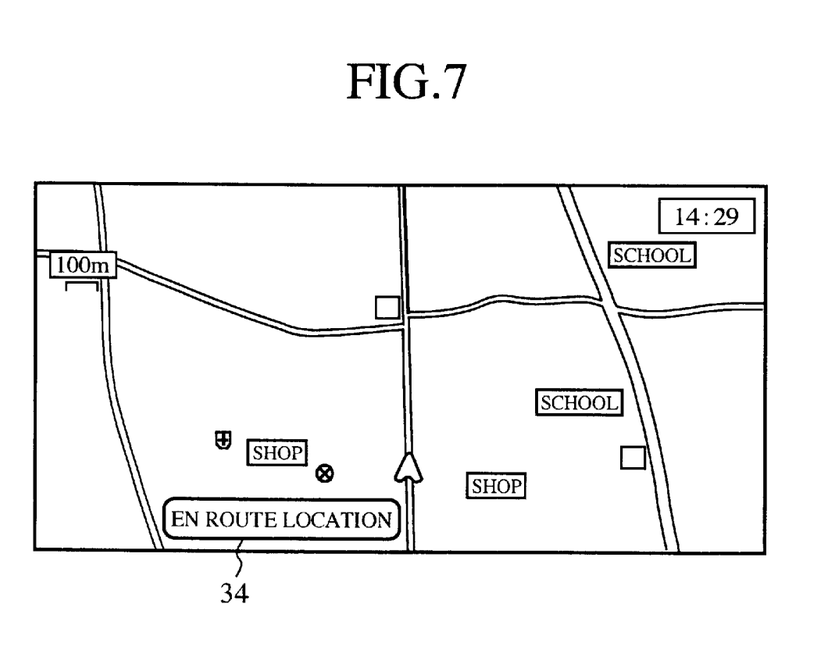
FIG. 7 is a view showing a display example in the navigation apparatus according to the first embodiment of the present invention.
Figure 8:
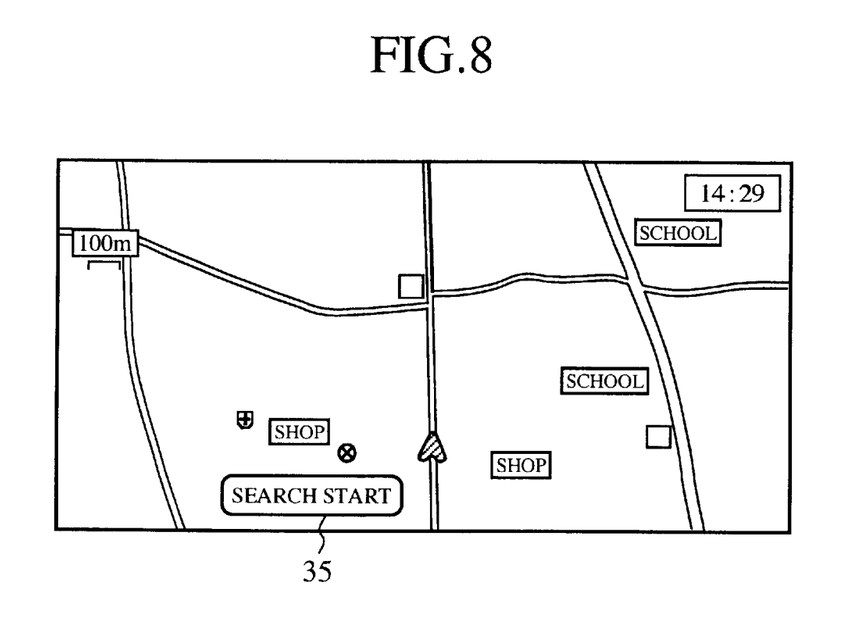
FIG. 8 is a view showing a display example in the navigation apparatus according to the first embodiment of the present invention.

In the case of FIG. 7 or 8 as well, when an en route location switch 34 or a search start switch 35 is turned on, the user's choices of the en route location or search are predicted to display a plurality of switches, representing options, on the screen automatically. That is, all the respective switches are function switches presented without the need for any special operations, and the function displayed on the switch can be automatically executed by operating the switch. Thus, a single operation can start a setting required by the user, without following many levels in the hierarchy.

In this case, to decrease the complexity of the operation, the function assigned to the function switch is restricted to the essential one. Complicated or meticulous condition setting or retrieval (for example, setting of a preference road (for pay, or free of charge) or a preference route (e.g., time, distance, road width) during route search) is to be performed using a menu screen, as has been done so far. If such setting or retrieval is to be performed using a function switch, default values defined in the system are used. The respective switches are presented at the same positions (in the examples of FIGS. 4 to 8, the lower portion of the screen (if the display position is fixed for example at the lower leftmost position for the destination switch and at the second left-hand position for the en route location switch, the user can recognize the switch position more easily)), regardless of the number of the switches to be presented.

Here, after it is determined whether the destination or the en route location has been set or not, the destination setting switch or the en route location setting switch has been presented. However, the destination setting switch or the en route location setting switch may be presented based on a determination of whether a scrolling operation has been performed or not. In this case, the position indicated by a cursor 36 when the setting switch has been operated is set as a destination or an en route location.

Figure 9:
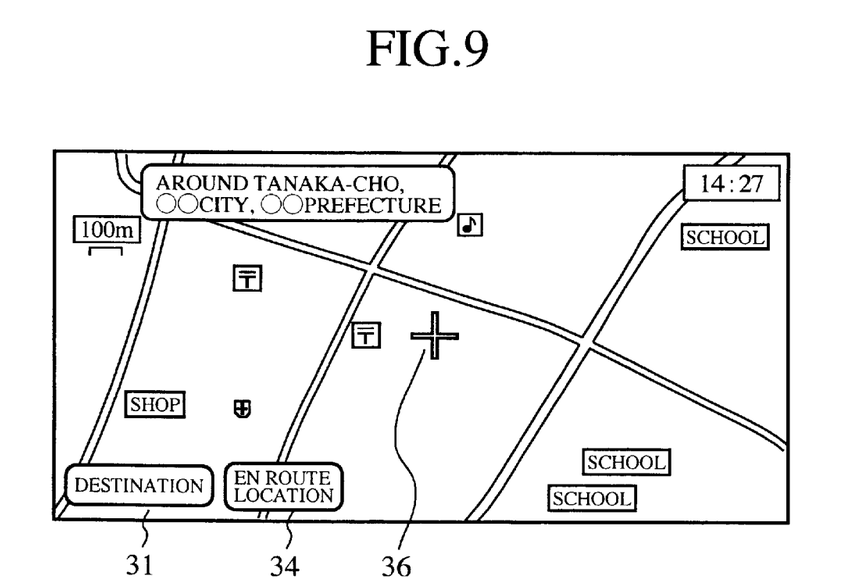
FIG. 9 is a view showing a display example in the navigation apparatus according to the first embodiment of the present invention.

FIG. 9 shows a screen example in which the destination setting switch 31 and the en route location setting switch 34 are presented when the screen is scrolled. Here, both the destination setting switch 31 and the en route location setting switch 34 are presented. When the destination has already been set, however, only the en route location setting switch 34 may be presented.

As described above, according to the first embodiment, a user's next operation is predicted, and a setting function which the user will need is inferred in view of the current various set situations, and presented as a function switch. Thus, the advantageous effect is obtained that the desired setting and retrieval can be performed, without the need for complicated switch operations.

Furthermore, a setting screen for display of a setting switch normally has a hierarchical structure. Thus, the navigation apparatus is adapted, for example, such that a manual change mode or a predicted change mode is set in accordance with an operation of a mode switch or the like; and that in the manual change mode, a sequential transition to the next lower level is effected by the operation, whereas in the predicted change mode, a transition to a target level is effected by the operation, with intermediate levels being skipped. In this case, the advantageous effect is obtained that the desired setting and retrieval can be performed, without the need for complicated switch operations which involve following many levels in the hierarchy.

Embodiment 2

Figure 10:
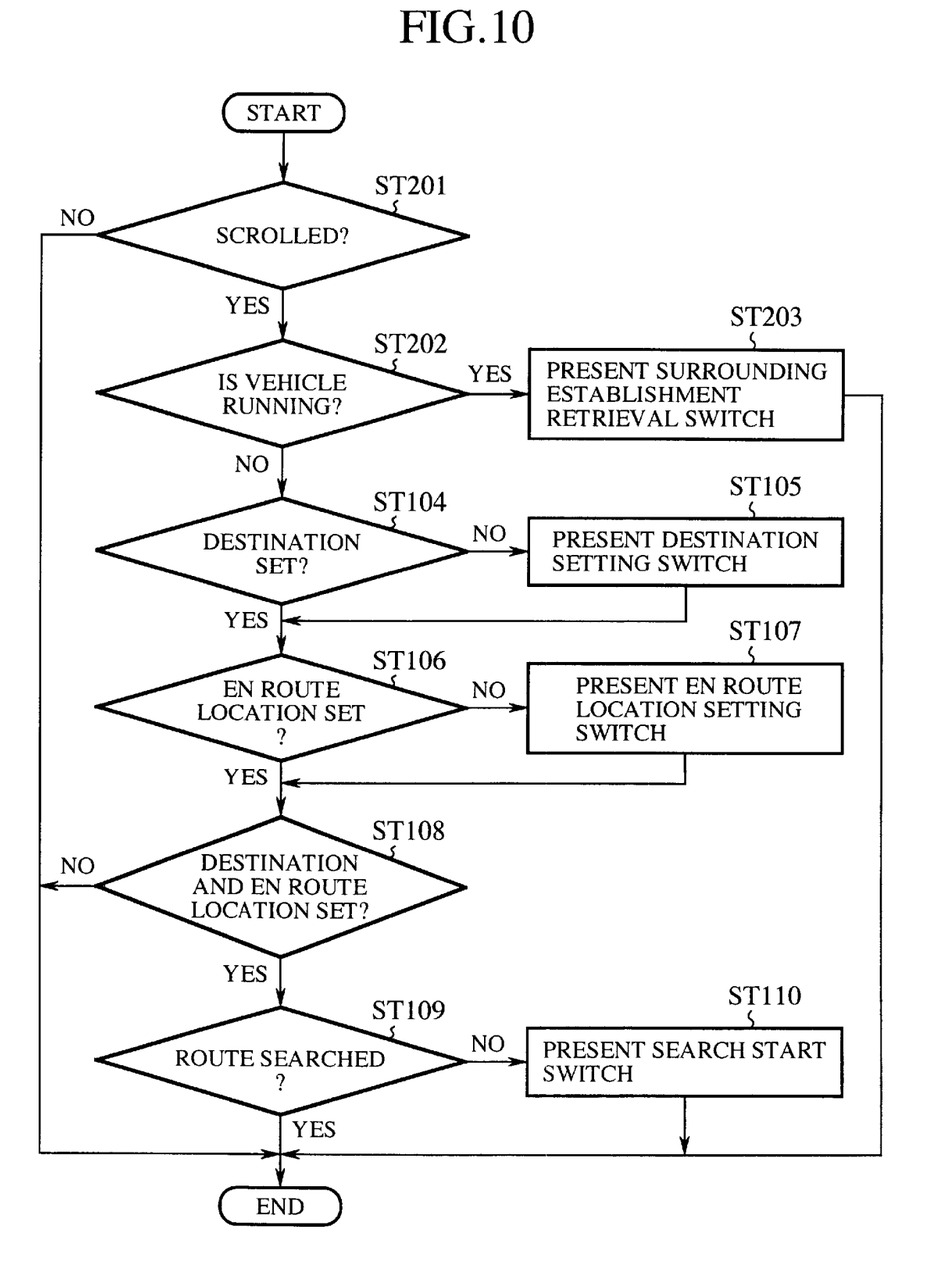
FIG. 10 is a flow chart for illustrating the actions of a navigation apparatus according to a second embodiment of the present invention.

The configuration of a second embodiment of the present invention is the same as that of the first embodiment as shown in FIG. 1. FIG. 10 is a flow chart for illustrating an operation for determining the arrangement and functions of operating switches according to the status after a user starts driving.

Next, the operation will be described below.

In Step ST201, it is determined whether the displayed map has been scrolled by the user. If it has not been scrolled, the processings as shown in FIG. 10 are completed. If the map has been scrolled, the program goes to Step ST202 to determine based on signals from the current position detecting means 12 (e.g., distance sensor 25 or GPS receiver 23 of FIG. 2) whether the vehicle is running or not. If it is running, the programs proceeds to Step ST203, predicting a retrieval switch for probably highly requested establishments in the surroundings, and presenting it as a function switch. If the vehicle is not running, the program goes to Step ST104. Then, the processings in Steps ST104 through ST110 are performed. The processings in Steps ST104 through ST110 are the same as in the first embodiment, and their explanations are omitted.

Figure 11:
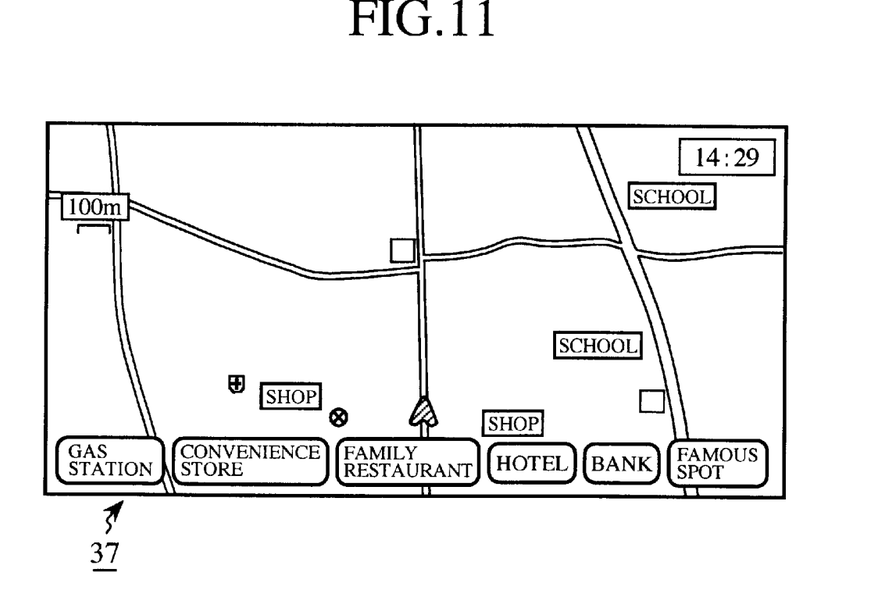
FIG. 11 is a view showing a display example in the navigation apparatus according to the second embodiment of the present invention.
Figure 12:
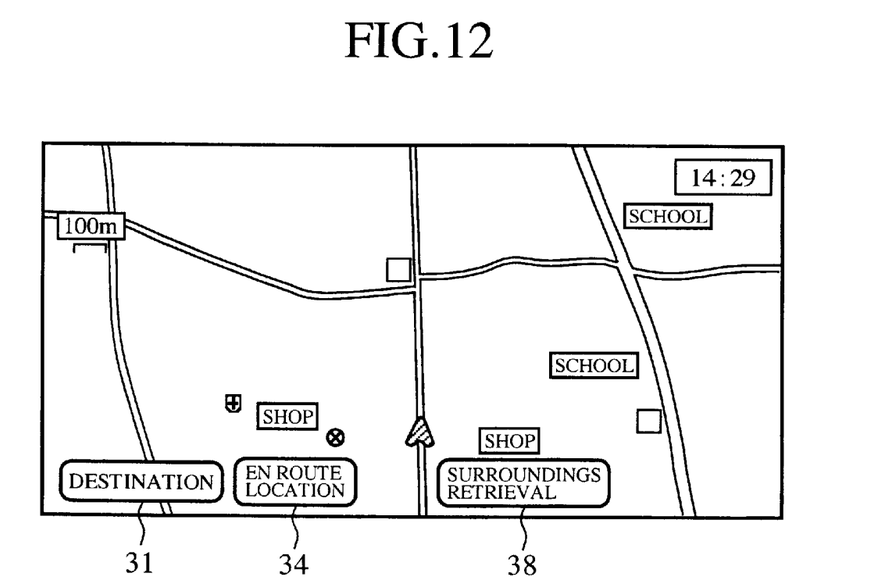
FIG. 12 is a view showing a display example in the navigation apparatus according to the second embodiment of the present invention.

FIG. 11 shows an example in which retrieval switches for surrounding establishments are presented. The user's choices for surrounding establishments are predicted, and a plurality of switches 37 are displayed as options. On the screen, the switches for a gas station, a convenience store, a family restaurant, etc. are presented. These retrieval switches for surrounding establishments are presented when the screen is scrolled while taking a drive, but they may be presented when the screen is scrolled at a stop of the vehicle. In this case, as shown in FIG. 12, a surroundings retrieval switch 38 is presented. By operating this switch, the retrieval switches 37 for surrounding establishments as shown in FIG. 11 are presented.

As described above, according to the second embodiment, by simply scrolling a displayed map screen, setting and retrieval functions which the user will need are inferred from the running status of the vehicle, and presented as function switches. Thus, the advantageous effect is obtained that the desired setting and retrieval can be performed without the need for complicated switch operations.

Embodiment 3

Figure 13:
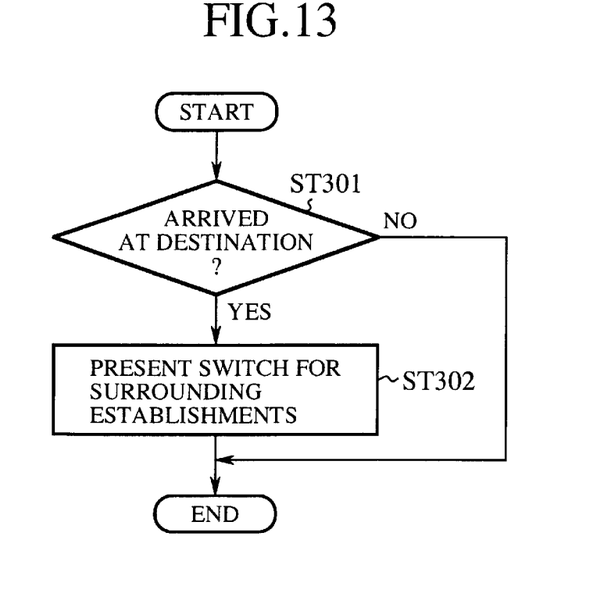
FIG. 13 is a flow chart for illustrating the actions of a navigation apparatus according to a third embodiment of the present invention.

The configuration of a third embodiment of the present invention is the same as that of the first embodiment as shown in FIG. 1. FIG. 13 is a flow chart for illustrating an operation for determining the arrangement and functions of operating switches after a user arrives at the destination.

Next, the operation will be described below.

In Step ST301, it is determined whether the vehicle has arrived at the destination or not. If it has not arrived at the destination, the processings shown in FIG. 13 are completed. If the vehicle has arrived at the destination, the program goes to Step ST302, presenting retrieval switches, for probably highly requested establishments in the surroundings, as function switches.

As described above, according to the third embodiment, when the vehicle has arrived at the destination, retrieval functions which the user will need are inferred, and presented as function switches. Thus, the advantageous effect is obtained that retrieval of a desired establishment can be performed without the need for complicated switch operations.

Embodiment 4

Figure 14:
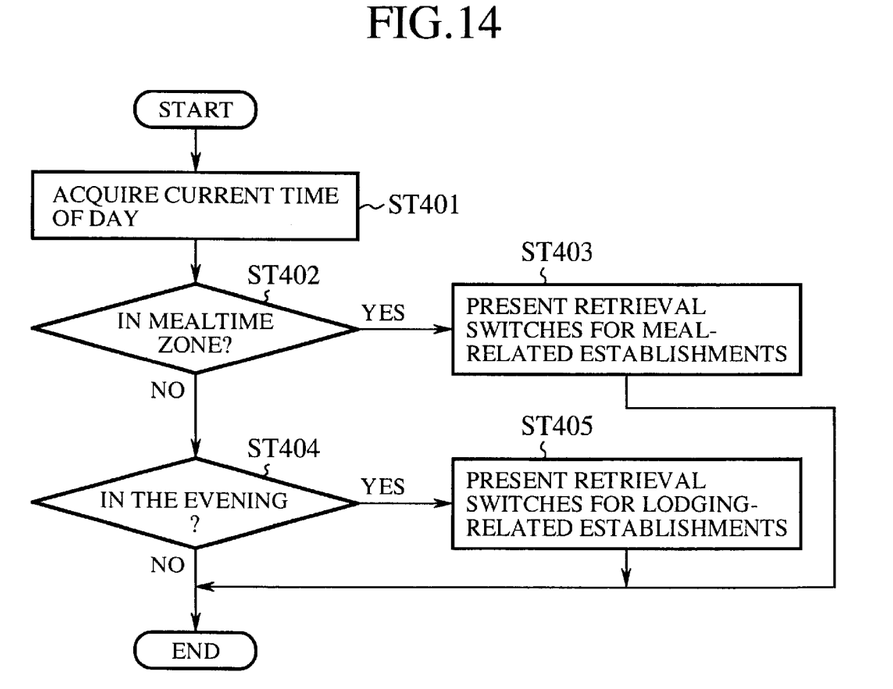
FIG. 14 is a flow chart for illustrating the actions of a navigation apparatus according to a fourth embodiment of the present invention.

The configuration of a fourth embodiment of the present invention is the same as that of the first embodiment as shown in FIG. 1. FIG. 14 is a flow chart for illustrating an operation for determining the arrangement and functions of operating switches from the current time of day.

Next, the operation will be described below.

Figure 15:
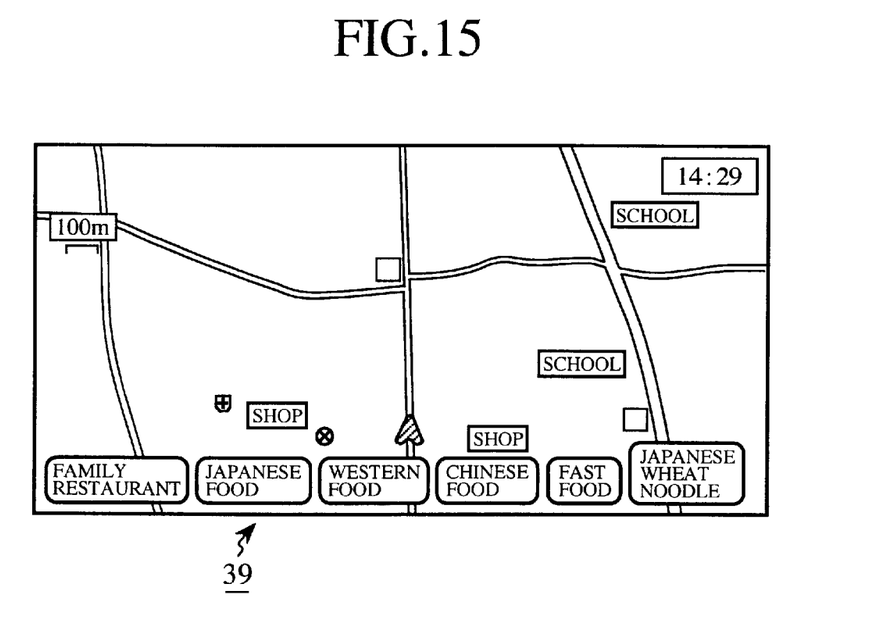
FIG. 15 is a view showing a display example in the navigation apparatus according to the fourth embodiment of the present invention.
Figure 16:
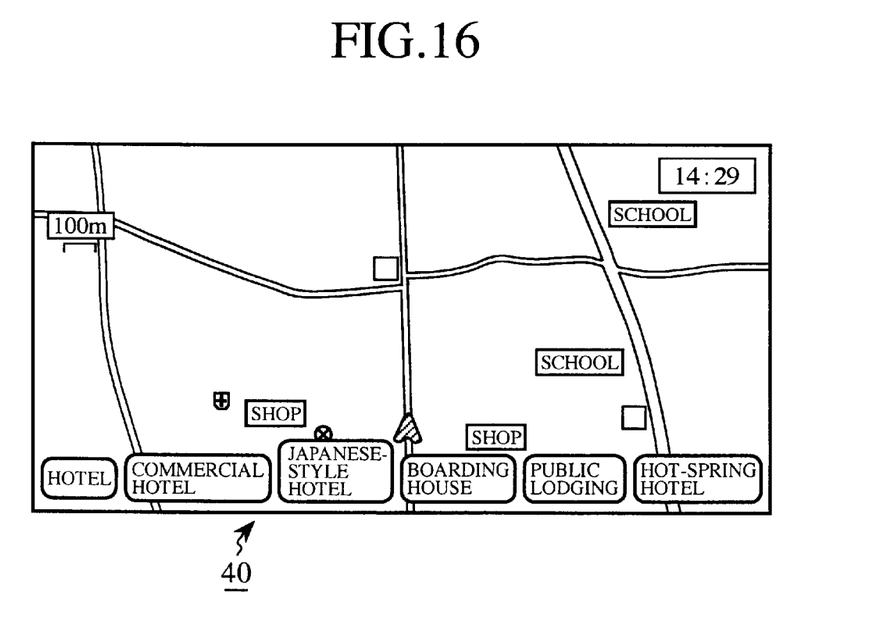
FIG. 16 is a view showing a display example in the navigation apparatus according to the fourth embodiment 4 of the present invention.

In Step ST401, the current time of day is acquired from GPS signals. Then, in Step ST402, it is determined whether the acquired current time of day is in a mealtime zone or not. If it is not in the mealtime zone, the program goes to Step ST404. If it is in the mealtime zone, the program goes to Step ST403, presenting retrieval switches 39 for meal-related establishments as function switches, as shown on the screen of FIG. 15. The mealtime zone may be fixed as default values like, for example, from 7:00 to 9:00 for breakfast, from 11:00 to 13:00 for lunch, and from 18:00 to 20:00 for dinner, or may be preset by the user. Then, in Step ST404, it is determined whether the current time of day is in the evening or not. If it is in the evening, the program goes to Step ST405, presenting retrieval switches 40 for lodging-related establishments as function switches, as shown on the screen of FIG. 16. The evening may be fixed as a default value like, for example, from 16:00 to 19:00, or may be preset by the user.

As described above, according to the fourth embodiment, retrieval functions which the user will need in the mealtime zone or the lodging time zone are inferred, and presented as function switches. Thus, this embodiment produces the advantageous effect that the desired establishment can be retrieved without the need for complicated switch operations.

Embodiment 5

Figure 17:
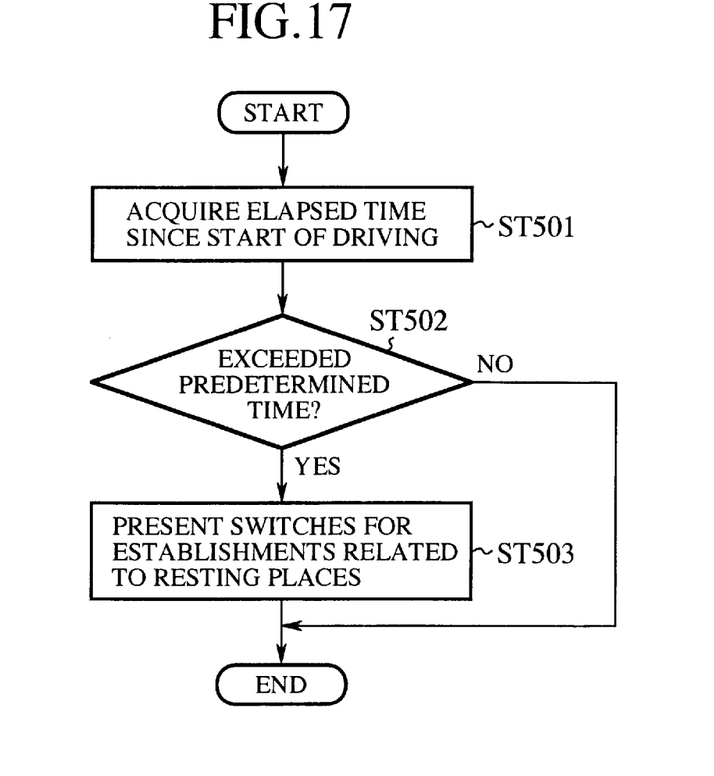
FIG. 17 is a flow chart for illustrating the actions of a navigation apparatus according to a fifth embodiment of the present invention.

The configuration of a fifth embodiment of the present invention is the same as that of the first embodiment shown in FIG. 1. FIG. 17 is a flow chart for illustrating an operation for determining the arrangement and functions of operating switches from the duration of driving, namely, the elapsed time since the start of driving.

Next, the operation will be described below.

Figure 18:
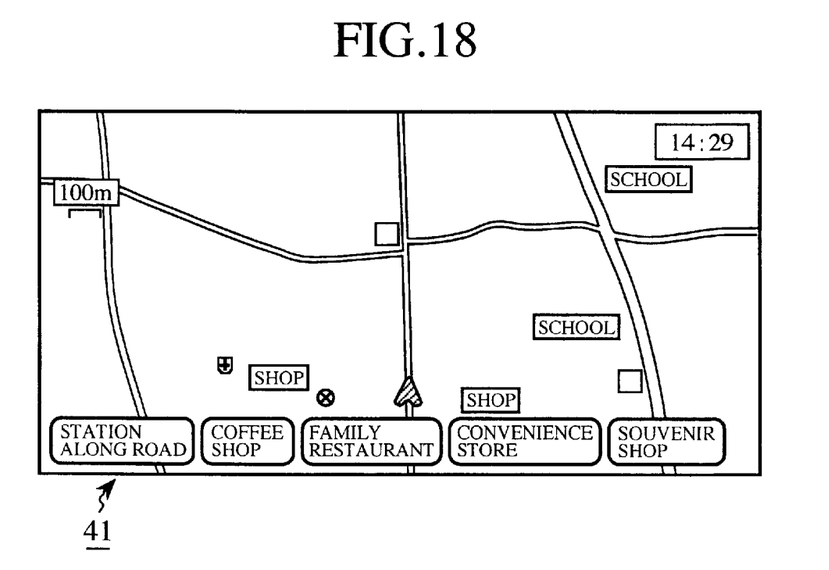
FIG. 18 is a view showing a display example in the navigation apparatus according to the fifth embodiment of the present invention.

In Step ST501, the elapsed time since the start of driving (activation of the ignition switch) is acquired. Then, in Step ST502, it is determined whether the acquired elapsed time has exceeded a predetermined period of time (e.g., 2 hours) or not. If it has not exceeded the predetermined period of time, the processings as shown in FIG. 17 are completed. If it has exceeded the predetermined period of time, the program goes to Step ST503, presenting retrieval switches 41 for establishments related to resting places as function switches, as shown on the screen of FIG. 18.

As described above, according to the fifth embodiment, when the duration of driving is long, retrieval functions which the user will need are inferred, and presented as function switches. Thus, the advantageous effect is obtained that the desired establishment can be retrieved without the need for complicated switch operations.

Embodiment 6

Figure 19:
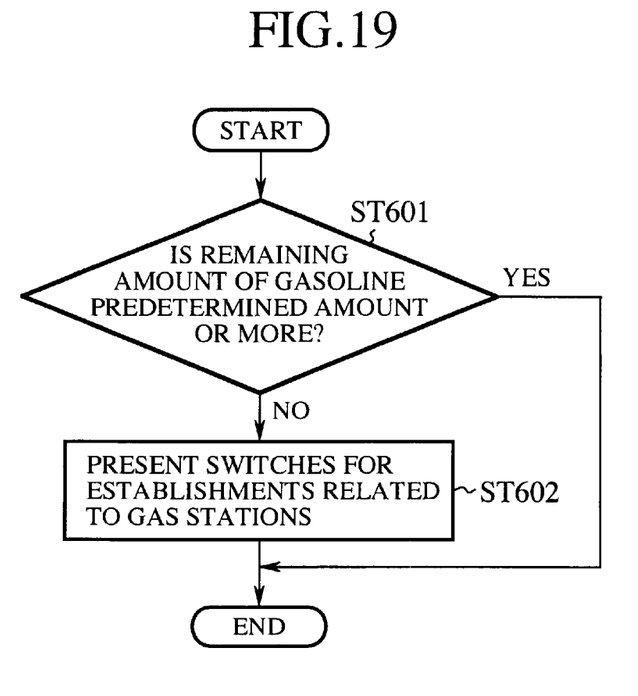
FIG. 19 is a flow chart for illustrating the actions of a navigation apparatus according to a sixth embodiment of the present invention.

The configuration of a sixth embodiment of the present invention is the same as that of the first embodiment shown in FIG. 1. FIG. 19 is a flow chart for illustrating an operation for determining the arrangement and functions of operating switches from vehicle information.

Next, the operation will be described below.

Figure 20:
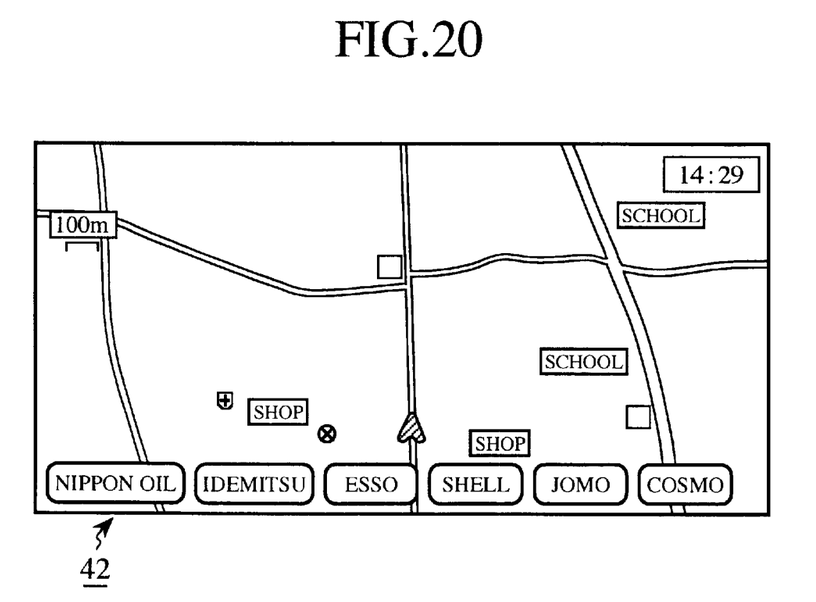
FIG. 20 is a view showing a display example in the navigation apparatus according to the sixth embodiment of the present invention.

In Step ST601, it is determined whether the remaining amount of gasoline is a predetermined amount (e.g., 10 liters) or more. If it is the predetermined amount or more, the processing as shown in FIG. 19 is completed. If it is less than the predetermined amount, the program goes to Step ST602, presenting retrieval switches 42 for establishments related to gas stations as function switches, as shown on the screen of FIG. 20. In this case, the establishments which the user will need are inferred from the remaining amount of fuel, and the establishments are presented. However, retrieval switches for automobile-related establishments, such as dealers or maintenance-related facilities, may be presented in view of the cumulative distance traveled (e.g., multiples of 10,000 kilometers).

As described above, according to the sixth embodiment, retrieval functions which the user will need are inferred from the state of the vehicle, and presented as function switches. Thus, the advantageous effect is obtained that the desired establishment can be retrieved without the need for complicated switch operations.

While the present invention has been described in the foregoing fashion, it is to be understood that the invention is not limited thereby, but may be varied in many other ways. Such variations are not to be regarded as a departure from the spirit and scope of the invention, and all such modifications as would be obvious to one skilled in the art are intended to be included within the scope of the appended claims.

What is claimed is:

1. A navigation apparatus comprising:

map data storage means for storing map data;

current position detecting means for detecting a current position of a vehicle and producing current position data;

operating means for performing various entries according to an operation;

display control means for displaying on predetermined display means a map screen based on the map data stored in the map data storage means, the current position of the vehicle on the map screen based on the current position data, and a setting screen for selection of a function by the operating means; and operating function control means for predicting a next operation according to the operation of the operating means and a current situation, and changing the function on the setting screen according to results of prediction.

2. The navigation apparatus according to claim 1, wherein the operating function control means changes the function in accordance with a set situation of each item.

3. The navigation apparatus according to claim 1, wherein the operating function control means changes the function in accordance with a state of the vehicle.

4. The navigation apparatus according to claim 1, wherein the operating function control means changes the function in accordance with a time of day.

5. The navigation apparatus according to claim 1, wherein the operating function control means changes the function in accordance with a duration of driving.

6. The navigation apparatus according to claim 1, wherein the operating function control means changes the function in accordance with information on the vehicle.

7. The navigation apparatus according to claim 1, wherein the operating means comprises a function switch.

8. A navigation method comprising the steps of:

detecting a current position of a vehicle and producing current position data;

performing various entries according to an operation of operating means;

displaying on predetermined display means a map screen based on map data stored in map data storage means, the current position of the vehicle on the map screen based on the current position data, and a setting screen for selection of a function by the operation of the operating means; and predicting a next operation according to the operation of the operating means and a current situation, and changing the function on the setting screen according to results of prediction.

9. The navigation method according to claim 8, wherein the step of changing the function changes the function in accordance with a set situation of each item.

10. The navigation method according to claim 8, wherein the step of changing the function changes the function in accordance with a state of the vehicle.

11. The navigation method according to claim 8, wherein the step of changing the function changes the function in accordance with a time of day.

12. The navigation method according to claim 8, wherein the step of changing the function changes the function in accordance with a duration of driving.

13. The navigation method according to claim 8, wherein the step of changing the function changes the function in accordance with information on the vehicle.

14. The navigation method according to claim 8, further comprising the steps of:

setting a manual change mode or a predicted change mode in accordance with the operation; and effecting a sequential transition of the function on the setting screen having a hierarchical structure to a next lower level by the operation in the manual change mode, or effecting a transition of the function on the setting screen to a target level by the operation, while skipping intermediate levels, in the predicted change mode.

15. A navigation program for allowing a computer in a navigation apparatus to function as:

map data storage means for storing map data;

current position detecting means for detecting a current position of a vehicle and producing current position data;

operation control means for performing various entries according to an operation of operating means;

display control means for displaying on predetermined display means a map screen based on the map data stored in the map data storage means, the current position of the vehicle on the map screen based on the current position data, and a setting screen for selection of a function by the operating means; and operating function control means for predicting a next operation according to the operation of the operating means and a current situation, and changing the function on the setting screen according to results of prediction.

* * * * *